(12) United States Patent
Kodama (10) Patent No.: US 12,398,814 B2
(45) Date of Patent: Aug. 26, 2025

(54) VALVE, FLUID CONTROL DEVICE, PRESSURIZING DEVICE, AND SPHYGMOMANOMETER

(71) Applicant: Murata Manufacturing Co., Ltd., Kyoto (JP)

(72) Inventor: Yukiharu Kodama, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 76 days.

(21) Appl. No.: 18/496,385

(22) Filed: Oct. 27, 2023

(65) Prior Publication Data

US 2024/0052933 A1    Feb. 15, 2024

Related U.S. Application Data

(63) Continuation of application No. PCT/JP2022/018531, filed on Apr. 22, 2022.

(30) Foreign Application Priority Data

May 6, 2021   (JP) ................. 2021-078258

(51) Int. Cl.
  *F16K 7/17*    (2006.01)
  *F16K 11/02*   (2006.01)
  *F16K 27/02*   (2006.01)

(52) U.S. Cl.
  CPC ............ *F16K 7/17* (2013.01); *F16K 27/0236* (2013.01); *F16K 11/022* (2013.01)

(58) Field of Classification Search
  CPC ...... F16K 7/17; F16K 11/022; F16K 27/0236; F16K 15/1402; F16K 15/144
  See application file for complete search history.

(56) References Cited

U.S. PATENT DOCUMENTS

| 4,513,766 A | 4/1985 | Seaborne |
| 4,648,245 A * | 3/1987 | Mayer ................... F16K 11/022 60/387 |

(Continued)

FOREIGN PATENT DOCUMENTS

| JP | S62-141610 U | 9/1987 |
| JP | H02-7196 A | 1/1990 |

(Continued)

OTHER PUBLICATIONS

Machine English translation of WO_2020084978_A1 (Year: 2025).*
International Search Report for PCT/JP2022/018531 dated Jul. 19, 2022.

*Primary Examiner* — Hailey K. Do (74) *Attorney, Agent, or Firm* — McDonald Hopkins LLC (57) ABSTRACT

A valve includes a housing, a membrane, and a hole. The housing includes a flat plate having a hole connectable to an external pump, a housing component having a hole connectable to a component to which a fluid is discharged, and a valve chamber held between a housing component including the flat plate and the housing component. The membrane divides a valve chamber into a space facing the flat plate and a space facing the housing component. The hole is connected to the space facing the flat plate and the space facing the housing component. The housing component has a hole that is connectable to an outside of the housing and that allows the fluid to flow out from the valve chamber.

18 Claims, 9 Drawing Sheets

(56) References Cited

U.S. PATENT DOCUMENTS

| | | | |
|---|---|---|---|
| 4,856,487 A | 8/1989 | Furuya | |
| 2007/0026269 A1* | 2/2007 | Nakakubo | F16K 99/0001 137/859 |
| 2013/0178752 A1 | 7/2013 | Kodama | |

FOREIGN PATENT DOCUMENTS

| | | | |
|---|---|---|---|
| JP | 3096050 U | 8/2003 | |
| JP | 2020-153404 A | 9/2020 | |
| WO | 2012/141113 A1 | 10/2012 | |
| WO | WO-2020084978 A1 * | 4/2020 | F04B 39/0027 |

* cited by examiner

VALVE, FLUID CONTROL DEVICE, PRESSURIZING DEVICE, AND SPHYGMOMANOMETER

CROSS REFERENCE TO RELATED APPLICATION

This is a continuation of International Application No. PCT/JP2022/018531 filed on Apr. 22, 2022 which claims priority from Japanese Patent Application No. 2021-078258 filed on May 6, 2021. The contents of these applications are incorporated herein by reference in their entireties.

BACKGROUND OF THE DISCLOSURE

Field of the Disclosure

The present disclosure relates to a valve that controls the flow direction of a fluid using a deformable membrane, and a fluid control device that includes the valve.

Description of the Related Art

Patent Document 1 describes a fluid control device that includes a piezoelectric pump and a check valve (valve). The housing of the check valve (valve) has a vent, a communicating hole, a quick-discharge hole, and a check valve hole. The vent is connected to the piezoelectric pump. The communicating hole and the check valve hole are connected to a cuff outside the fluid control device. The quick-discharge hole is connected to the outside of the housing of the check valve.

The housing includes a first wall and a second wall that are parallel to each other. The vent and the check valve hole are formed in the first wall. The communicating hole and the quick-discharge hole are formed in the second wall.

The housing includes a diaphragm. The diaphragm divides the internal space in the housing into a first-wall-side space and a second-wall-side space.

The diaphragm is deformed by the flow of the fluid to perform the switching between gas inflow into the cuff and gas outflow from the quick-discharge hole.

Patent Document 1: International Publication No. 2012/141113

BRIEF SUMMARY OF THE DISCLOSURE

However, the device described in Patent Document 1 including a diaphragm (a membrane) that functions as an existing check valve may have unwanted vibrations of the diaphragm (the membrane) when gas is discharged through the quick-discharge hole.

Thus, a possible benefit of the present disclosure is to reduce vibrations of a membrane when gas is discharged through a quick-discharge hole.

The present disclosure provides a valve that includes a housing, a membrane, and a communicating passage. The housing includes a first wall having a first hole connectable to an external pump, a second wall having a second hole connectable to a component to which a fluid is discharged, and a valve chamber held between the first wall and the second wall that oppose each other. The membrane divides the valve chamber into a space nearer the first wall and a space nearer the second wall. The communicating passage connects the space nearer the first wall and the space nearer the second wall to each other.

The second wall includes a third hole that is connectable to the outside of the housing and allows the fluid to flow out from the valve chamber. When viewed in a first direction of the housing in which the first wall, the membrane, and the second wall are arranged, the membrane, an opening surface of the first hole facing the valve chamber, and an opening surface of the third hole facing the valve chamber overlap each other, and the communicating passage overlaps neither the opening surface of the first hole facing the valve chamber nor the opening surface of the third hole facing the valve chamber, and the opening surface of the first hole facing the valve chamber and the opening surface of the third hole facing the valve chamber at least partially overlap each other.

In this structure, at the start when the fluid flows out from the second hole to the third hole, a passage (a first passage) from the second hole to the third hole and a passage (a second passage) from the second hole to the first hole through the communicating passage are formed, the membrane is located in the middle between the first hole and the third hole, and the fluid flows at substantially the same quantity of flow through the first passage and the second passage.

This structure can reduce an immediate change of the passage cross section of the first passage and a change of the velocity of flow. This structure thus reduces attraction of the membrane to the third hole after the membrane is deformed toward the first hole. This operation reduces vibrations of the membrane.

The first passage has a smaller pressure loss than the second passage. Thus, the fluid flows to the first passage at a higher rate, and the membrane covers the opening of the first hole. Thus, the fluid is discharged through the third hole. The membrane covers the first hole with almost no vibrations, and thus, the fluid is more stably and rapidly discharged through the third hole.

The present disclosure can reduce vibrations of a membrane when gas is discharged through a quick-discharge hole.

DETAILED DESCRIPTION OF THE DISCLOSURE

First Embodiment

Figure 1:
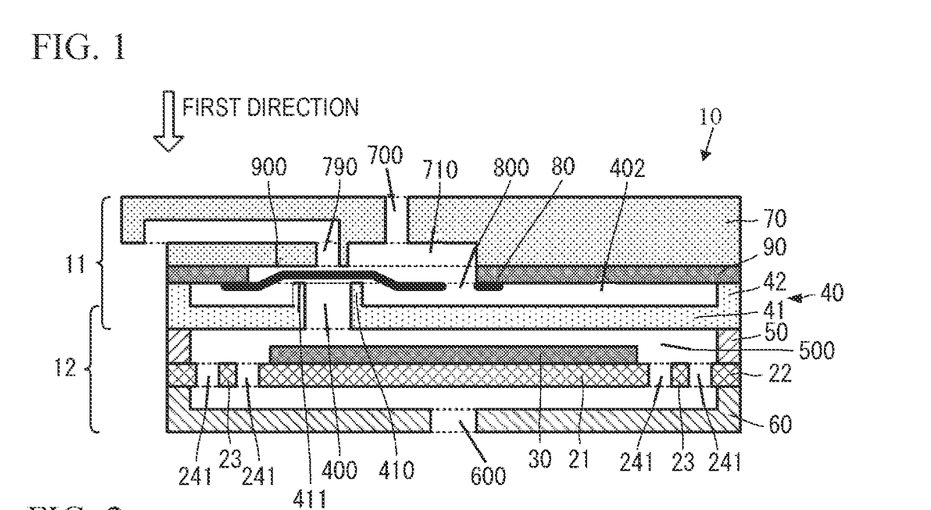
FIG. 1 is a schematic side cross-sectional view of a structure of a fluid control device according to a first embodiment.
Figure 2:
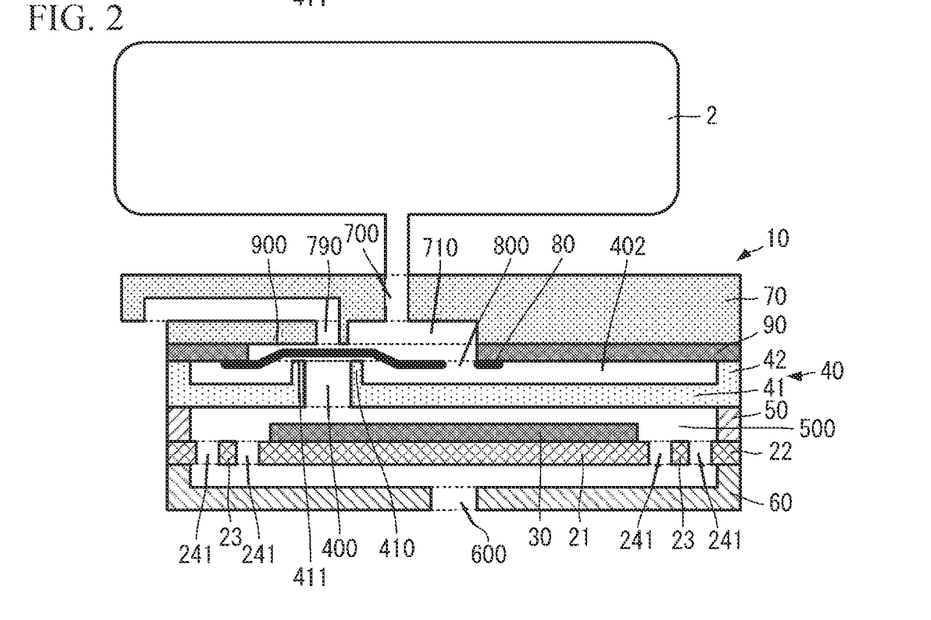
FIG. 2 is a diagram of the fluid control device according to the first embodiment to which a cuff is attached.

With reference to the drawings, a valve and a fluid control device according to a first embodiment of the present disclosure are described. FIG. 1 is a schematic side cross-sectional view of a structure of a fluid control device according to a first embodiment. FIG. 2 is a diagram of the fluid control device according to the first embodiment to which a cuff is attached. Throughout the drawings, the shapes of components in each of embodiments including the present embodiment are illustrated in a partially or entirely exaggerated manner for ease of understanding the structures of the valve and the fluid control device. In addition, although gas (for example, air) is used below as an example of a fluid, the structure in the present application is also applicable to the case where a liquid is used as an example of the fluid.

As illustrated in FIGS. 1 and 2, a fluid control device 10 includes a valve 11 and a pump 12. The valve 11 and the pump 12 share a common component, and are integrally formed as a unit. A cuff 2 is connected to the valve 11. The cuff 2 corresponds to "a component to which a fluid is discharged" in the present disclosure.

Schematically, to supply gas to the cuff 2, the pump 12 is driven to supply gas from the pump 12 into the valve 11. The gas supplied into the valve 11 is discharged into the cuff 2 through a hole 700 in the valve 11. To discharge the gas from the cuff 2, the pump 12 is stopped being driven. The gas from the cuff 2 flows from the hole 700 into the valve 11, and flows out through a hole 790 to the outside of the valve 11, in other words, to the outside of the fluid control device 10.

(Valve 11)

Figure 3A:
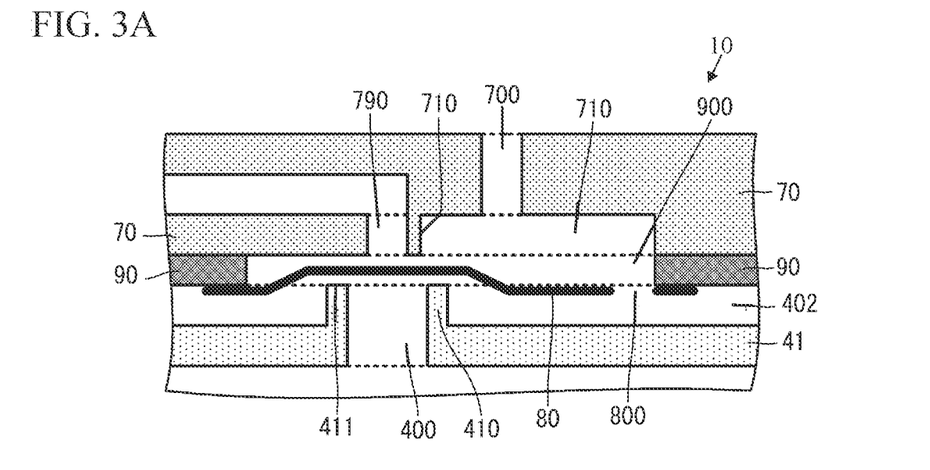
FIG. 3A is a partially enlarged side cross-sectional view of a valve according to the first embodiment.
Figure 3B:
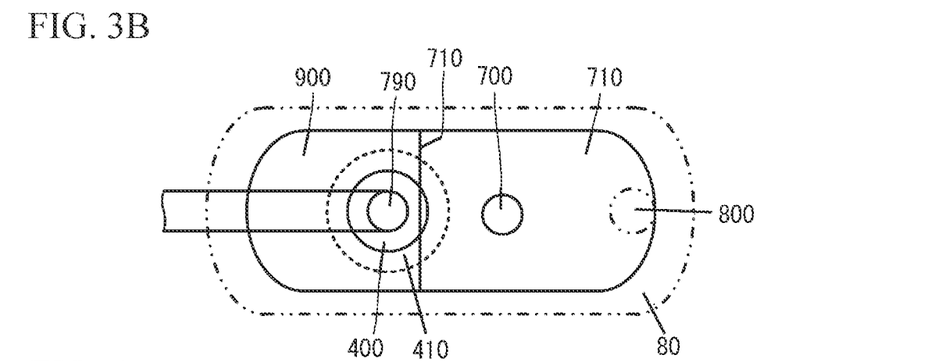
FIG. 3B is a perspective plan view illustrating the relationship between each hole and the membrane.

FIG. 3A is a partially enlarged side cross-sectional view of the valve according to the first embodiment, and FIG. 3B is a perspective plan view illustrating the relationship between each hole and the membrane. With reference to FIG. 1, FIG. 2, FIG. 3A, and FIG. 3B, a specific structure of the valve 11 is described below.

The valve 11 includes a housing component 40, a housing component 70, a membrane 80, and a holding plate 90.

The housing component 40 includes a flat plate 41 and a side wall 42, and is formed from a material such as metal or resin. The flat plate 41 corresponds to "a first wall" in the present disclosure.

The side wall 42 is connected to the outer edge of the flat plate 41. The side wall 42 protrudes from a first main surface of the flat plate 41. The flat plate 41 and the side wall 42 may be integrally formed or separately formed and joined or bonded together. The flat plate 41 and the side wall 42 define a recess 402.

The flat plate 41 includes a protrusion 410 protruding from its first main surface to which the side wall 42 is connected. The protrusion 410 has a hole 400 extending through the protrusion 410 in a height direction. The protrusion 410 with this shape having the hole 400 has, for example, a hollow cylindrical shape or a circular shape in a plan view (viewed in a direction perpendicular to the first main surface). The first main surface and a second main surface of the flat plate 41 are connected to each other through the hole 400. The hole 400 serves as a communicating hole in the valve 11 connected to the pump 12, and corresponds to "a first hole" in the present disclosure. A flat surface at the boundary where the hole 400 is connected to the valve chamber is an opening surface of the hole 400 facing the valve chamber.

The housing component 70 has a plate shape, and is formed from metal or resin. When viewed in a plan, the housing component 70 has substantially the same shape as the housing component 40. The housing component 70 corresponds to "a second wall" in the present disclosure.

The housing component 70 has the hole 700, a hole 710, and the hole 790. The hole 700 is open in the first main surface of the housing component 70. A flat surface at the boundary where the hole 700 is connected to the outside is an outer opening surface of the hole 700. The hole 710 is open in the second main surface (facing the valve chamber) of the housing component 70. A flat surface at the boundary where the hole 710 is connected to the valve chamber is an outer opening surface of the hole 710. The hole 700 and the hole 710 overlap each other in a plan view (when viewed in a direction perpendicular to the first main surface and the second main surface). The hole 700 and the hole 710 are connected to each other. The hole defined by the hole 700 and the hole 710 connected to each other corresponds to "a second hole" in the present disclosure. The hole 700 corresponds to "a first portion" in the present disclosure, and the hole 710 corresponds to "a second portion" in the present disclosure.

The first end of the hole 790 is open in the second main surface (facing the valve chamber) of the housing component 70. A flat surface at the boundary where the hole 790 is connected to the valve chamber is an opening surface of the hole 790 facing the valve chamber. The second end of the hole 790 is open in an outer surface of the housing component 70. A flat surface at the boundary where the hole 790 is connected to the outside is an outer opening surface of the hole 790. The hole 790 corresponds to "a third hole" in the present disclosure.

The membrane 80 is called a valvular membrane or a diaphragm, and formed from a deformable material, such as a rubber sheet. The membrane 80 has a hole 800 near the outer edge. The hole 800 extends through the membrane 80 in a thickness direction. The hole 800 corresponds to "a communicating passage" in the present disclosure.

The holding plate 90 has a plate shape, and is formed from, for example, metal or resin. The holding plate 90 has an opening portion 900. The opening portion 900 extends through the holding plate 90 in the thickness direction, and has a shape smaller than the profile of the membrane 80 when viewed in a plan.

The holding plate 90 holds the membrane 80 while allowing the membrane 80 to overlap the opening portion 900. The holding plate 90 holds the outer edge portion of the membrane 80 while allowing the hole 800 to be connected to the opening portion 900.

When viewed in a plan, the opening portion 900 in the holding plate 90 is greater than the opening surface of the hole 700 and the opening surface of the hole 790.

These components are assembled in the following positional relationship to form the valve 11.

The holding plate 90 and the housing component 70 are sequentially placed on the side of the housing component 40 toward which the side wall 42 protrudes. The holding plate 90 abuts on the side wall 42. The second main surface of the housing component 70 is connected to the holding plate 90.

In this structure, the housing component 70 is connected to the housing component 40 while holding the membrane 80 and the holding plate 90 in between and while having its second main surface facing the first main surface of the flat plate 41 of the housing component 40. Thus, the housing of the valve 11 formed by the housing component 40, the housing component 70, and the holding plate 90 defines a valve chamber, or a space to which the recess 402 of the housing component 40 and the opening portion 900 of the holding plate 90 are connected. In other words, the valve chamber is a space held between the flat plate 41 of the housing component 40 and the housing component 70.

In this structure, the membrane 80 is located in the valve chamber, and between the flat plate 41 of the housing component 40 and the housing component 70. The membrane 80 divides the valve chamber into a first space facing the housing component 40 (a space defined by the recess 402 or a first-wall-side space) and a second space facing the housing component 70 (a space defined by the opening portion 900 or a second-wall-side space). The first space and the second space are connected to each other with the hole 800 in the membrane 80.

The hole 400 is connected to the first space defined by the recess 402, and the hole 710 (the hole 700) and the hole 790 are connected to the second space defined by the opening portion 900. More specifically, the hole 400 is located across from the hole 710 (the hole 700) and the hole 790 with the membrane 80 interposed in between. When the valve 11 is viewed in a plan (viewed in a direction in which the housing component 40, the membrane 80, and the housing component 70 are arranged (in the first direction of the valve 11)), the membrane 80 is located to overlap the hole 400, the hole 710 (the hole 700), and the hole 790.

When the valve 11 is viewed in a plan, the opening surface of the hole 400 facing the valve chamber (the first space) and the opening surface of the hole 790 facing the valve chamber (the second space) overlap each other. More specifically, the opening surface of the hole 790 facing the valve chamber (the second space) completely overlaps the opening surface of the hole 400 facing the valve chamber (the first space). In this case, the complete overlap of the opening surfaces indicates that, for example, as illustrated in FIG. 1, when the area of the opening surface of the hole 790 is smaller than the area of the opening surface of the hole 400, the entirety of the opening surface of the hole 790 is located within the range of the opening surface of the hole 400 in a plan view.

When the valve 11 is viewed in a plan, the hole 800 overlaps neither the opening surface of the hole 400 facing the valve chamber, nor the opening surface of the hole 790 facing the valve chamber. Preferably, the hole 800 overlaps the hole 710.

(Operation of Valve 11)

As described below, the valve 11 with the above structure performs an operation of supplying gas to the cuff 2 and an operation of discharging the gas from the cuff 2.

(Operation of Supplying Gas to Cuff 2)

Figure 4:
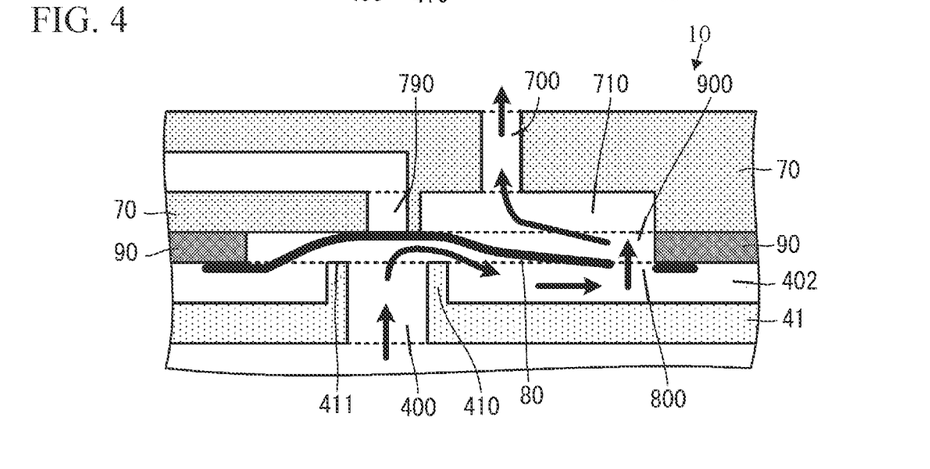
FIG. 4 is a partially enlarged side cross-sectional view of the valve, illustrating the flow of gas to a cuff during a gas supply operation.

FIG. 4 is a partially enlarged side cross-sectional view of the valve, illustrating the flow of the gas to the cuff during a gas supply operation.

The pump 12 described below is driven to supply gas to the cuff 2. Driving the pump 12 causes the gas to flow into the first space of the valve chamber from the pump 12 through the hole 400. The gas that has flowed in from the hole 400 presses the membrane 80. Thus, the membrane 80 is deformed to cover the hole 790 in the housing component 70. The hole 790 is thus closed by the membrane 80.

The gas that has flowed into the first space flows along the membrane 80 through the first space into the second space through the hole 800. The gas that has flowed into the second space is discharged out of the valve 11 through the hole 710 and the hole 700. The hole 700 is connected to the cuff 2. The gas discharged out of the valve 11 from the hole 700 is supplied to the cuff 2.

At this time, the hole 790 is closed by the membrane 80, and the membrane 80 is pressed against the wall surface of the housing component 70 facing the pump chamber with a predetermined pressure from the side facing the first space. Thus, the gas that has flowed into the second space from the hole 800 is discharged from the hole 700 without leaking into the hole 790. Thus, the gas can be efficiently supplied to the cuff 2.

(Operation of Discharging Gas from Cuff 2)

Figure 5A:
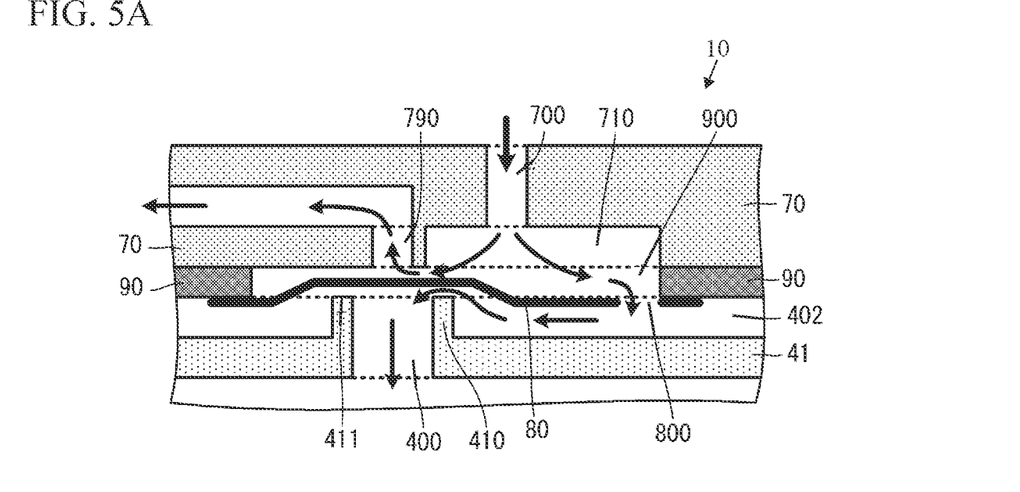
FIG. 5A and FIG. 5B are partially enlarged side cross-sectional views of the valve, illustrating the flow of gas to a cuff during a gas discharging operation.
Figure 5B:
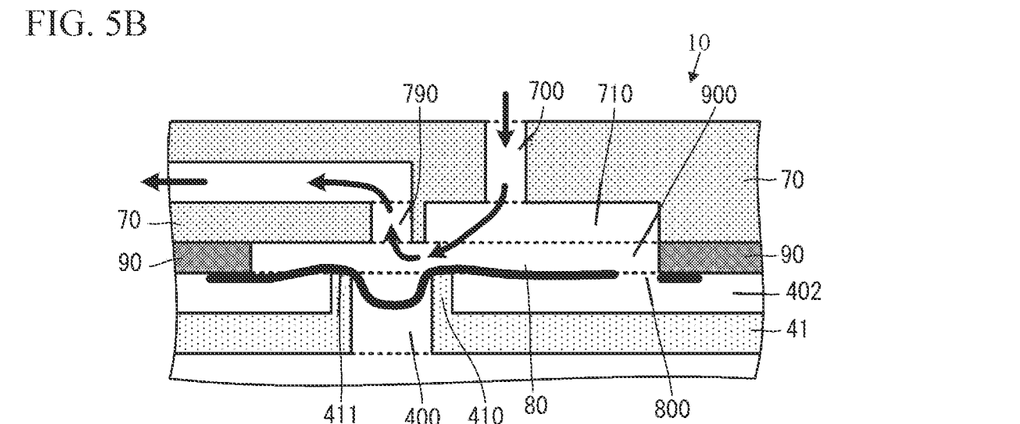

FIG. 5A and FIG. 5B are partially enlarged side cross-sectional views of the valve, illustrating a flow of the gas from the cuff during a gas discharging operation. FIG. 5A illustrates a transient state (an initial state) of the discharge, and FIG. 5B illustrates a steady state of the discharge.

To discharge the gas from the cuff 2, driving of the pump 12 described below is stopped. The stop of the pump 12 removes the pressure caused by the gas flowing into the cuff 2. Thus, the cuff 2 has a higher pressure than the valve chamber. The gas in the cuff 2 thus flows into the second space of the valve chamber through the hole 700 and the hole 710.

(Transient State)

As illustrated in FIG. 5A, in the transient state, part of the gas that has flowed into the second space presses the membrane 80 toward the housing component 40. Thus, the membrane 80 moves away from the wall surface of the housing component 70 facing the pump chamber. The hole 790 is thus connected to the second space.

In the transient state, part of the gas that has flowed into the second space flows into the first space through the hole 800. In the transient state, the membrane 80 is not in contact with the housing component 40. Thus, as illustrated in FIG.

5A, the gas that has flowed into the first space flows through the first space along the membrane 80, and flows out from the hole 400.

Thus, in the transient state, the gas flows on both sides of the membrane 80 facing the hole 790 (through the second space) and facing the hole 400. In a plan view, the hole 790 and the hole 400 overlap each other. In this area, the membrane 80 receives substantially the same pressure from both of the first space and the second space (a pressure balanced state). Particularly, when the quantity of the flow of the gas to the hole 790 and the quantity of the flow of the gas to the hole 400 are the same, the membrane 80 receives the same pressure. Thus, as illustrated in FIG. 5A, the membrane 80 is in contact with neither the housing component 40 nor the housing component 70.

More specifically, a passage (a first passage) from the hole 700 to the hole 790 and a passage (a second passage) from the hole 700 to the hole 400 through the hole 800 are formed. This structure can reduce an immediate change of the passage cross section of the first passage and a change of the velocity of flow, and reduce a sharp bend of the membrane 80 toward the first space due to an air flow into the hole 790. This structure can thus reduce, for example, a bend of the membrane 80 toward the second space in reaction to the membrane 80 colliding against the inner wall surface of the flat plate 41 or the far end of the protrusion 410, and thus reduce vibrations of the membrane 80.

When the gas keeps flowing into the second space, this balanced state is lost. More specifically, the hole 710 and the hole 790 are located on the same side of the membrane 80, and the hole 710 and the hole 400 are located across the membrane 80 from each other. Thus, the pressure loss of the passage from the hole 710 to the hole 790 is smaller than the pressure loss from the hole 710 to the hole 400. This difference in pressure loss can be adjusted by adjusting, for example, the size or position of the hole 800.

From the relationship of this pressure loss, the gas more easily flows from the hole 710 to the hole 790, and flows to the hole 790 at a higher rate as more time passes from the start of the discharge. Thus, the membrane 80 is deformed toward the housing component 40, and then comes into contact with a far end surface 411 of the protrusion 410 of the housing component 40. As illustrated in FIG. 5B, the membrane 80 covers the hole 400, and thus almost all the gas from the hole 710 flows into the hole 790. In other words, the membrane 80 is deformed almost linearly toward the inner wall surface of the flat plate 41 or the far end of the protrusion 410 while causing almost no large vibrations.

Thus, the valve 11 can discharge the gas in the cuff 2 to the outside with almost no vibrations of the membrane 80.

In contrast, in a comparison structure (a structure where the hole 790 and the hole 400 are spaced far apart in a plan view), immediately after being discharged from the cuff 2, the gas flows into the hole 790, and due to its velocity of flow, the membrane 80 is attracted to the hole 790 again, and almost entirely closes the hole 790. Thereafter, the membrane is separated again from the hole 790 by the gas pressure, and collides against the opposing wall surface. The membrane thus vibrates. The comparison structure thus causes unwanted vibration sounds. In addition, repeated covering and uncovering of the hole 790 prevents an increase of the discharge speed.

In contrast, the valve 11 according to the present application can reduce unwanted vibration sounds, and improve the gas discharge speed.

The valve 11 includes the protrusion 410, but may include no protrusion 410. Nevertheless, the valve 11 including the protrusion 410 can adjust the distance between the opening surface of the hole 400 and the opening surface of the hole 790 without changing the capacity of the pump chamber. Thus, the valve 11 can control the quantity of the flow and the velocity of the flow of the fluid on both sides of the membrane 80 in the above transient state, and can more reliably reduce the occurrence of vibrations.

In the valve 11, the hole 710 is widened toward the hole 790 further than the hole 700. The hole 710 may eliminate the portion widened toward the hole 790. Nevertheless, the hole 710 including the portion widened toward the hole 790 can reduce the pressure loss of the gas flowing from the hole 700 into the hole 790. More specifically, the cross section of the opening of the hole 710 that is greater than the cross section of the opening of the hole 700 can reduce the pressure loss of the gas flowing from the hole 700 to the hole 790. The cross section of the opening indicates the cross section of the hole 700 and the hole 710 taken along the plane parallel to the opening surfaces of the hole 700 and the hole 710.

This structure can further enhance the discharge speed of the gas. Preferably, at least part of the portion of the hole 710 widened toward the hole 790 overlaps the hole 400. Thus, the pressure loss of the gas flowing from the hole 700 to the hole 790 can be further reduced.

In the valve 11, the hole 400 and the hole 790 overlap each other in a plan view. Thus, the area of the membrane 80 can be further reduced than in a structure where the hole 790 and the hole 400 are spaced apart in a plan view. This structure can achieve the size reduction of the membrane 80, and the size reduction of the valve 11.

In the valve 11, the hole 800 is formed in the membrane 80. Thus, the hole 800 can be located at a position facing an operation position of the valve 11, that is, the position where the hole 790 and the hole 400 overlap each other. Thus, the valve 11 can achieve further size reduction.

(Pump 12)

As illustrated in FIG. 1 and FIG. 2, the pump 12 includes a main flat plate 21, a frame 22, couplers 23, a piezoelectric element 30, the flat plate 41 of the housing component 40, a side wall member 50, and a lid member 60. The flat plate 41 of the housing component 40 is shared between the valve 11 and the pump 12.

The main flat plate 21 is circular in a plan view. The frame 22 is disposed to surround the main flat plate 21. The multiple couplers 23 have a beam shape, and are disposed between the main flat plate 21 and the frame 22. The multiple couplers 23 support the main flat plate 21 to allow the main flat plate 21 to vibrate with respect to the frame 22.

The piezoelectric element 30 is circular in a plan view. The piezoelectric element 30 includes a piezoelectric body and a driving conductor. The piezoelectric element 30 is disposed on the first main surface of the main flat plate 21. At this time, the center of the piezoelectric element 30 and the center of the main flat plate 21 are aligned with each other. Aligning also includes the case where the centers are misaligned but fall within the range of allowable errors.

The piezoelectric element 30 is distorted with an application of a driving voltage. The main flat plate 21 vibrates with a stress caused by distortion of the piezoelectric element 30.

The side wall member 50 has an annular shape with a hollow 500, and is disposed between the frame 22 and the housing component 40. The side wall member 50 is connected to the frame 22 and the housing component 40.

A space (the hollow 500) defined by a structure including the main flat plate 21, the frame 22, and the couplers 23, the housing component 40, and the side wall member 50 serves as a pump chamber of the pump 12.

The lid member 60 includes a flat plate portion and a frame portion. The frame portion protrudes from the first main surface of the flat plate portion. The flat plate portion has a hole 600 that extends through the flat plate portion.

The lid member 60 is disposed to cover the main flat plate 21, and the frame portion of the lid member 60 is connected to the frame 22.

In this structure, when the main flat plate 21 vibrates in the manner as described above, the gas is sucked into the pump 12 through the hole 600, and discharged into the valve chamber of the valve 11 through the hole 400.

In this structure, the fluid control device 10 implements the valve 11 and the pump 12 with a single housing while sharing the flat plate 41 and the hole 400 of the housing component 40. Thus, the fluid control device 10 can reduce its thickness and its size. In addition, the fluid control device 10 including the valve 11 described above can reduce unwanted vibration sounds, and can more rapidly discharge gas from the cuff 2.

Second Embodiment

A valve and a fluid control device according to a second embodiment of the present disclosure are described with reference to the drawings.

Figure 6:
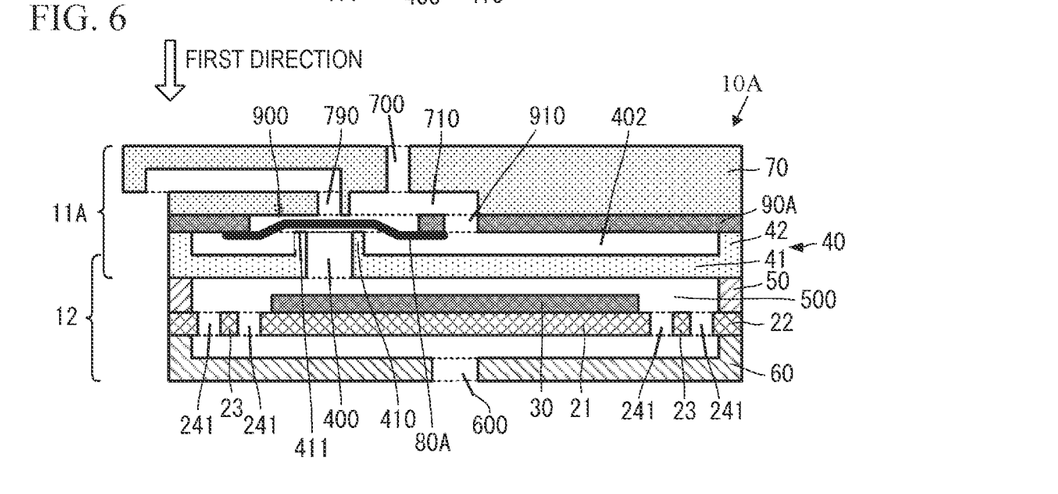
FIG. 6 is a schematic side cross-sectional view of a structure of a fluid control device according to a second embodiment.
Figure 7A:
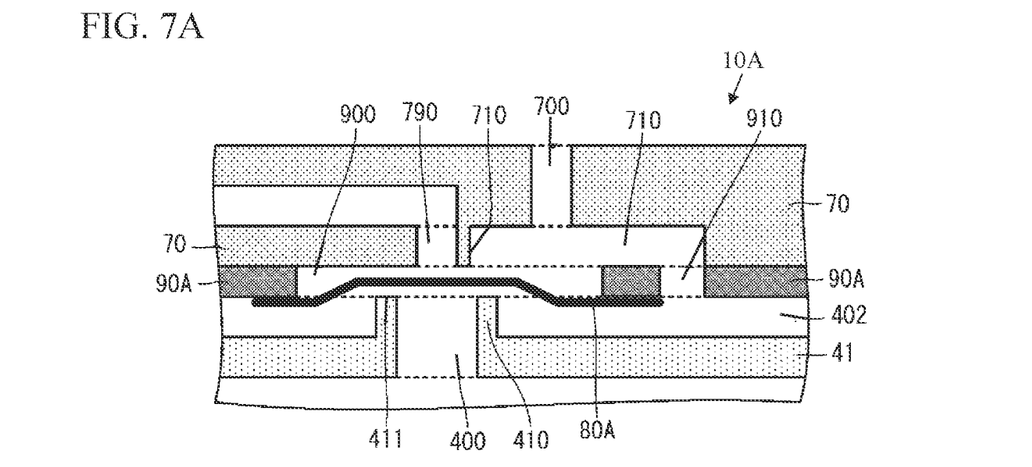
FIG. 7A is a partially enlarged side cross-sectional view of a valve according to the second embodiment.

FIG. 6 is a schematic side cross-sectional view of a structure of a fluid control device according to the second embodiment. FIG. 7A is a partially enlarged side cross-sectional view of the valve according to the second embodiment, and FIG. 7B is a perspective plan view illustrating the relationship between each hole and the membrane.

Figure 7B:
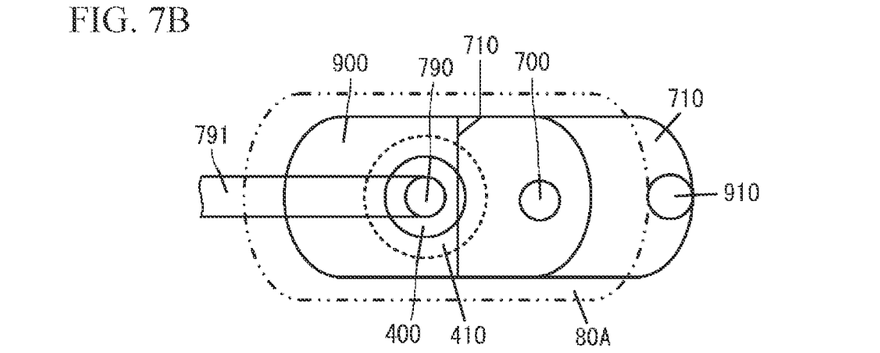
FIG. 7B is a perspective plan view illustrating the relationship between each hole and the membrane.

As illustrated in FIG. 6, FIG. 7A, and FIG. 7B, a fluid control device 10A according to the second embodiment differs from the fluid control device 10 according to the first embodiment in terms of the structure of a valve 11A. Other components of the fluid control device 10A are the same as those of the fluid control device 10, and thus are not described.

The fluid control device 10A includes a valve 11A. The valve 11A includes a membrane 80A and a holding plate 90A.

While being disposed on the housing component 70, the holding plate 90A protrudes into an area overlapping the hole 710 in a plan view. In other words, the holding plate 90A includes a portion that extends inward from the outer edge of the valve chamber. Thus, the holding plate 90A has an opening portion 900 with a smaller area than that of the holding plate 90.

The holding plate 90A has a hole 910 in the protrusion. The hole 910 extends through the holding plate 90A in the thickness direction. The hole 910 corresponds to "a communicating passage" in the present disclosure.

The membrane 80A is greater than the opening portion 900 of the holding plate 90A. The membrane 80A covers the opening portion 900 without covering the hole 910. The outer edge portion of the membrane 80A is fixed to the holding plate 90A. When the valve 11A is viewed in a plan, the membrane 80A overlaps the opening surface of the hole 400 facing the valve chamber, and the opening surface of the hole 790 facing the valve chamber.

The valve 11A with this structure can reduce vibrations of the membrane 80A. In addition, the valve 11A can reduce the area of the membrane 80A, more specifically, the area of a deformed region of the membrane 80A. Thus, the membrane 80A can improve its response speed.

Third Embodiment

A valve and a fluid control device according to a third embodiment of the present disclosure are described with reference to the drawings.

Figure 8A:
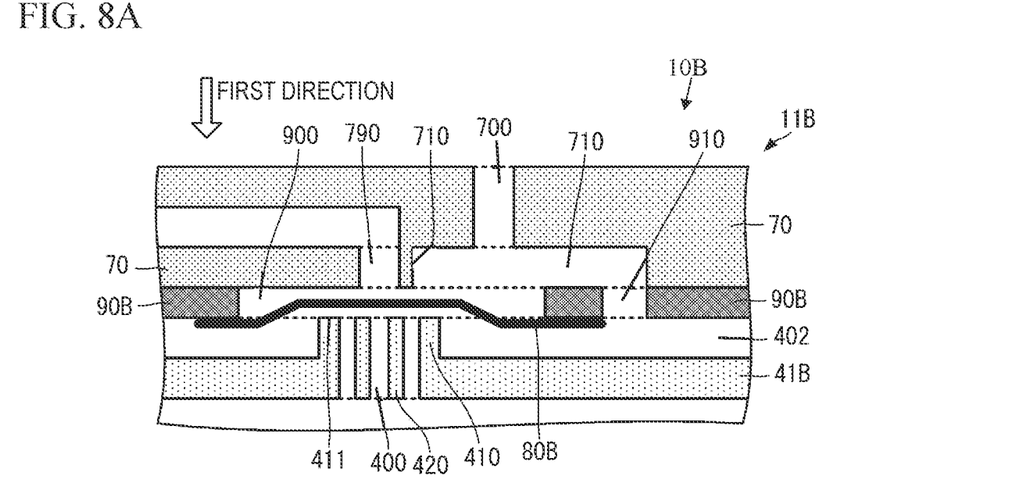
FIG. 8A is a partially enlarged side cross-sectional view of a valve according to a third embodiment.
Figure 8B:
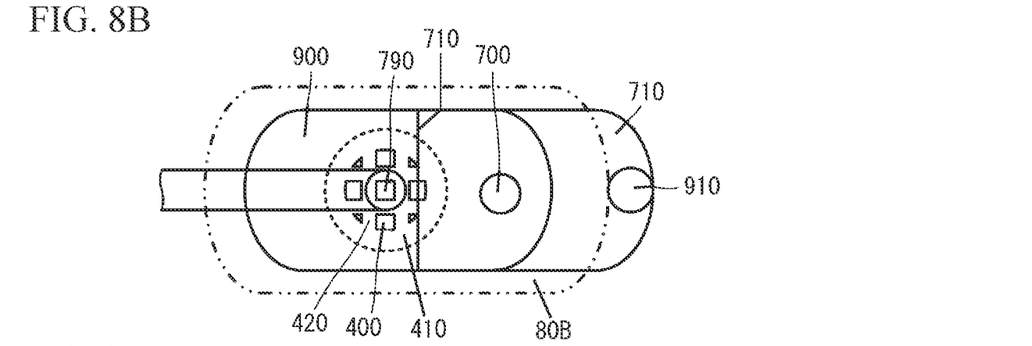
FIG. 8B is a perspective plan view illustrating the relationship between each hole and the membrane.

FIG. 8A is a partially enlarged side cross-sectional view of the valve according to the third embodiment, and FIG. 8B is a perspective plan view of the relationship between each hole and the membrane.

As illustrated in FIG. 8A and FIG. 8B, a fluid control device 10B according to a third embodiment differs from the fluid control device 10A according to the second embodiment in terms of the structure of a valve 11B. Other components of the fluid control device 10B are the same as those in the fluid control device 10A, and thus are not described. A membrane 80B in the drawing is the same as the membrane 80A, and a holding plate 90B is the same as the holding plate 90A, and thus they are not specifically described.

The valve 11B includes a flat plate 41B. The flat plate 41B includes a support member 420. The support member 420 is formed in the hole 400. The support member 420 has, for example, a mesh shape in a plan view. In other words, the support member 420 partially closes the hole 400 while allowing the gas to pass through the hole 400.

The end surface of the support member 420 facing the pump chamber is flush with the far end surface 411 of the protrusion 410.

Figure 9:
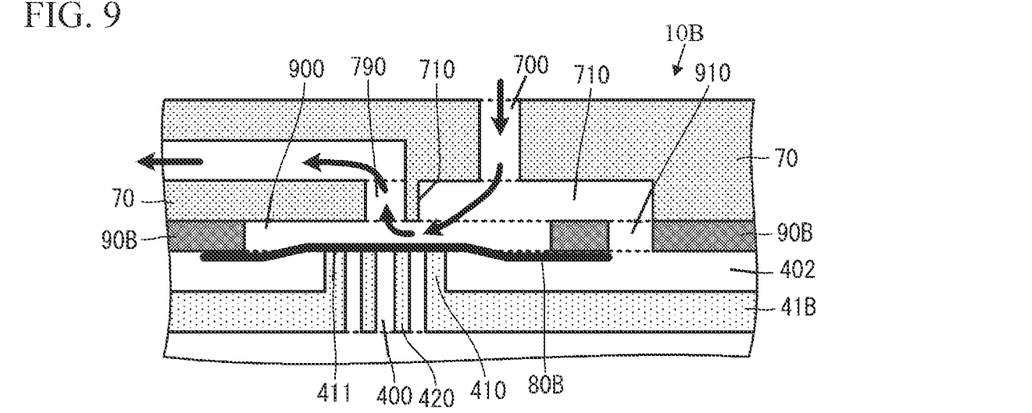
FIG. 9 is a partially enlarged side cross-sectional view of the valve, illustrating the flow of gas from a cuff during a gas discharging operation.

FIG. 9 is a partially enlarged side cross-sectional view of the valve, illustrating a flow of the gas from the cuff during a gas discharging operation. FIG. 9 illustrates the steady state of the discharging operation.

As illustrated in FIG. 9, when the gas flows in from the cuff 2 through the hole 700 and the hole 710, and the membrane 80B is deformed to come into contact with the far end surface 411 of the protrusion 410, the membrane 80B also comes into contact with the support member 420, and is supported by the support member 420. This structure prevents the membrane 80B from entering the hole 400. This structure thus reduces the amount of the deformation of the membrane 80B, and thus improves the deformation responsiveness of the membrane 80B to a flow of the gas.

Fourth Embodiment

A valve and a fluid control device according to a fourth embodiment of the present disclosure are described with reference to the drawings.

Figure 10A:
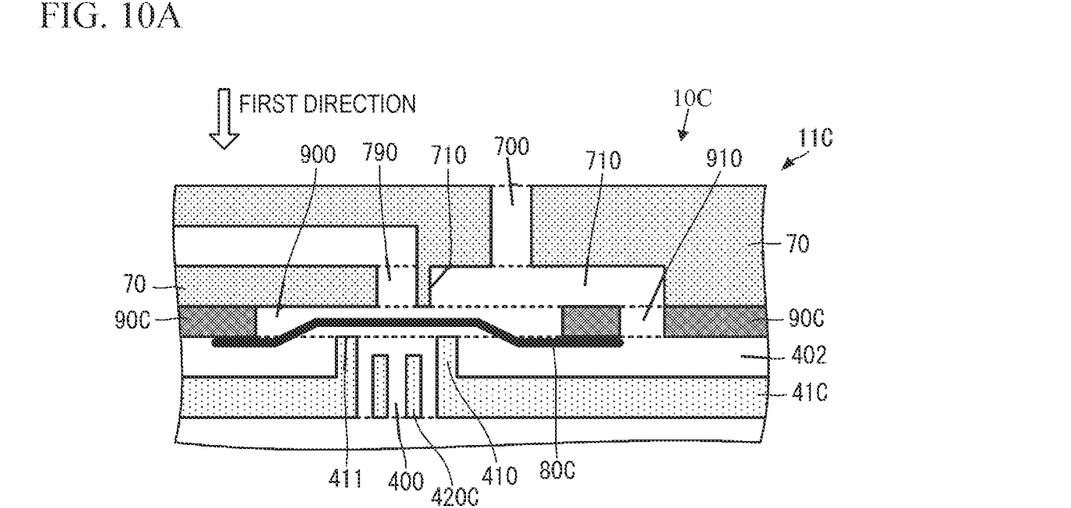
FIG. 10A is a partially enlarged side cross-sectional view of a valve according to a fourth embodiment.
Figure 10B:
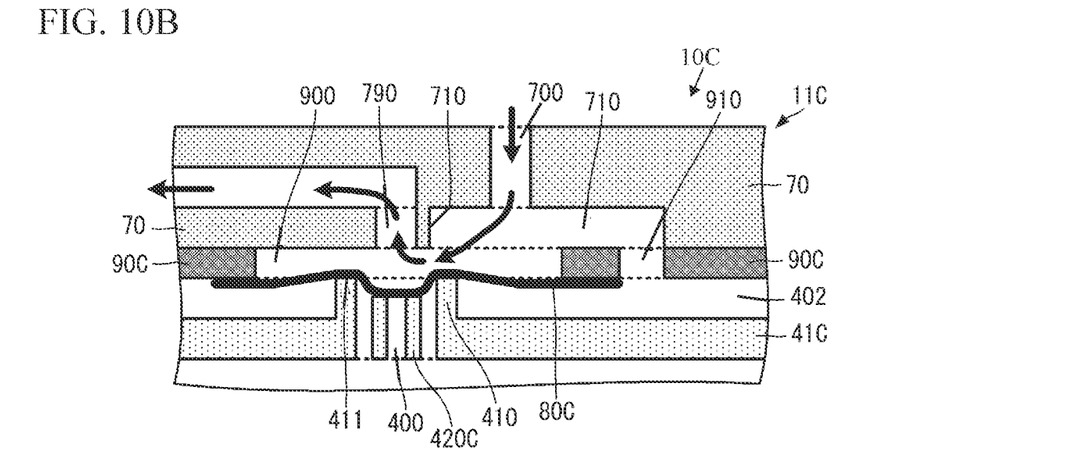
FIG. 10B is a partially enlarged side cross-sectional view of the valve, illustrating the flow of gas from a cuff during a gas discharging operation.

FIG. 10A is a partially enlarged side cross-sectional view of the valve according to the fourth embodiment, FIG. 10B is a partially enlarged side cross-sectional view of the valve, illustrating a flow of the gas from the cuff during a gas discharging operation. FIG. 10B illustrates the steady state of the discharging operation.

As illustrated in FIG. 10A and FIG. 10B, a fluid control device 10C according to a fourth embodiment differs from the fluid control device 10B according to the third embodiment in terms of the structure of a valve 11C. Other components of the fluid control device 10C are the same as those in the fluid control device 10B, and thus are not described. A membrane 80C in the drawing is the same as the membrane 80B, and a holding plate 90C is the same as the holding plate 90B, and thus they are not specifically described.

The valve 11C includes a flat plate 41C. The flat plate 41C includes a support member 420C. The support member 420C is disposed in the hole 400. In a plan view, the support member 420C has the same shape as the support member 420 of the valve 11B.

The end surface of the support member 420C facing the valve chamber is disposed further inward in the hole 400 than the far end surface 411 of the protrusion 410.

As illustrated in FIG. 10B, when the gas flows in from the cuff 2 through the hole 700 and the hole 710, and the membrane 80C is deformed to come into contact with the far end surface 411 of the protrusion 410, a portion of the membrane 80C that overlaps the opening surface of the hole 400 enters the hole 400 to come into contact with the support member 420C and to be supported by the support member 420C. At this time, adjusting the position of the end surface of the support member 420C allows the membrane 80C to enter the hole 400 by an intended depth. This structure can thus improve the deformation responsiveness of the membrane 80C to the flow of the gas, and achieve a predetermined discharge speed.

Fifth Embodiment

A valve and a fluid control device according to a fifth embodiment of the present disclosure are described with reference to the drawings.

Figure 11A:
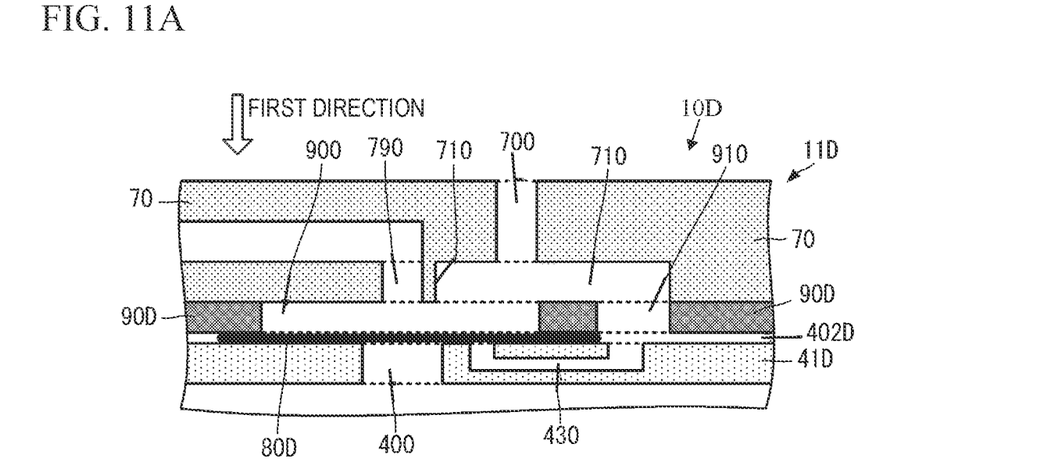
FIG. 11A is a partially enlarged side cross-sectional view of a valve according to a fifth embodiment.
Figure 11B:
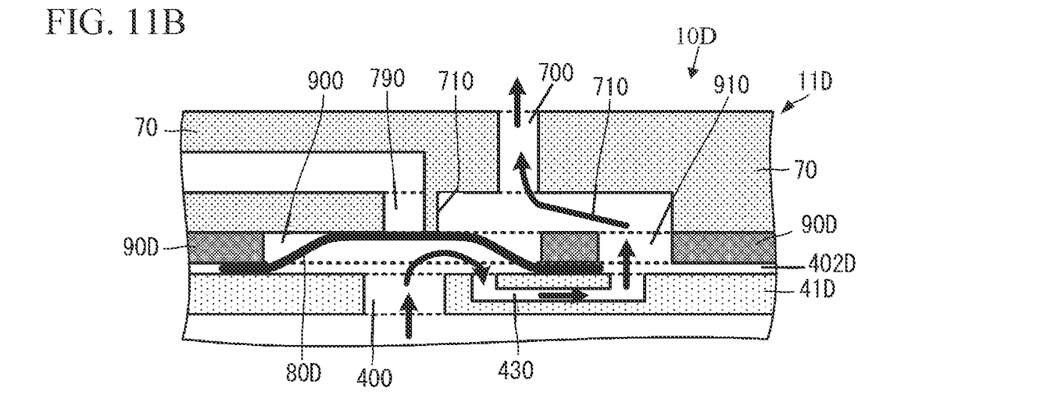
FIG. 11B is a diagram of the flow of gas to a cuff during a gas supply operation.
Figure 11C:
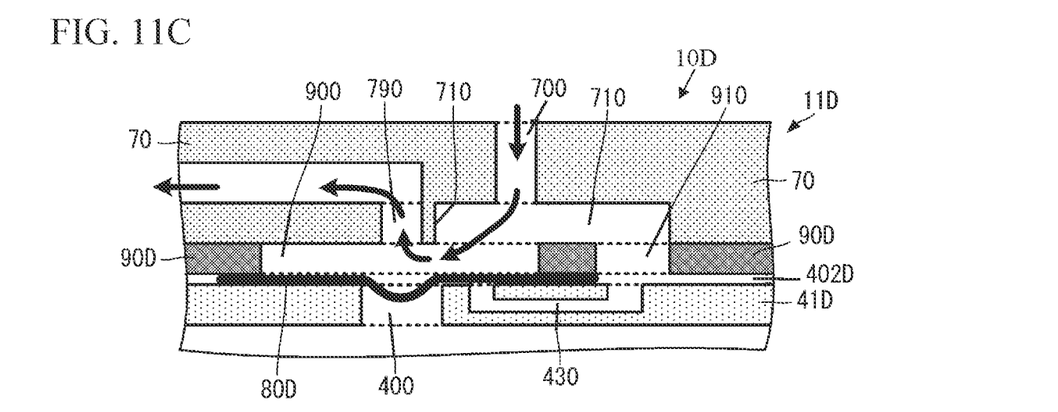
FIG. 11C is a partially enlarged side cross-sectional view of the valve, illustrating the flow of gas from a cuff during a gas discharging operation.

FIG. 11A is a partially enlarged side cross-sectional view of the valve according to the fifth embodiment, FIG. 11B is a diagram of a flow of the gas to the cuff during a gas supply operation, and FIG. 11C is a partially enlarged side cross-sectional view of the valve, illustrating a flow of the gas from the cuff during a gas discharging operation. FIG. 11C illustrates the steady state of the discharging operation.

As illustrated in FIG. 11A, FIG. 11B, and FIG. 11C, a fluid control device 10D according to the fifth embodiment differs from the fluid control device 10A according to the second embodiment in terms of the structure of a valve 11D. Other components of the fluid control device 10D are the same as those in the fluid control device 10A, and thus are not described. A membrane 80D in the drawings is the same as the membrane 80A, and a holding plate 90D is the same as the holding plate 90A, and thus is not specifically described.

The valve 11D includes a flat plate 41D. The flat plate 41D includes a communicating hole 430. When the valve 11D is viewed in a plan, a first opening of the communicating hole 430 overlaps the opening portion 900. A second opening of the communicating hole 430 overlaps the hole 910. In other words, in a plan view, the communicating hole 430 is formed in the flat plate 41D to extend through to connect the opening portion 900 and the hole 910 in the holding plate 90D.

The housing component including the flat plate 41D has a side wall with a small height. In a static state where no gas flows, the membrane 80D is in contact with the main surface of the flat plate 41D facing the pump chamber.

In this structure, to supply gas to the cuff 2, as illustrated in FIG. 11B, the membrane 80D closes the hole 790 to connect the communicating hole 430 to the valve chamber. Thus, the valve 11D allows the gas to flow into the valve 11D from the hole 400, and discharges the gas to the cuff 2 through the communicating hole 430, the hole 910, the hole 710, and the hole 700.

To discharge the gas from the cuff 2, as illustrated in FIG. 11C, the membrane 80D closes the hole 400 to connect the hole 790 to the valve chamber. Thus, the valve 11D discharges the gas from the cuff 2 to the outside of the valve 11D through the hole 700, the hole 710, and the hole 790. At this time, for example, the cross section of the communicating hole 430 is adjusted to implement the state where the pressure on both sides of the membrane 80D is balanced in the transient state of discharging. Thus, the valve 11D can reduce vibrations of the membrane 80D.

Sixth Embodiment

A valve and a fluid control device according to a sixth embodiment of the present disclosure are described with reference to the drawings.

Figure 12:
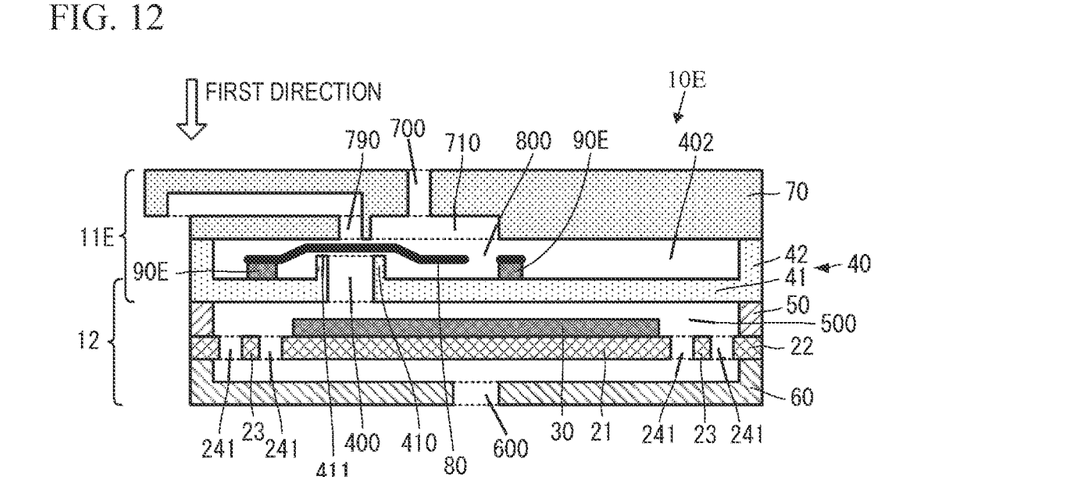
FIG. 12 is a schematic side cross-sectional view of a structure of a fluid control device according to a sixth embodiment.

FIG. 12 is a schematic side cross-sectional view of a structure of a fluid control device according to a sixth embodiment.

As illustrated in FIG. 12, a fluid control device 10E according to a sixth embodiment differs from the fluid control device 10 according to the first embodiment in terms of the structure of a valve 11E. Other components of the fluid control device 10E are the same as those in the fluid control device 10, and thus are not described.

The fluid control device 10E includes a valve 11E. The valve 11E includes a holding plate 90E. The holding plate 90E has, for example, an annular shape. The holding plate 90E holds the outer edge portion of the membrane 80. The holding plate 90E is fixed to the flat plate 41 of the housing component 40.

When the valve 11E is viewed in a plan, the holding plate 90E is fixed while allowing the membrane 80 to overlap the hole 400 and the hole 790.

In this structure, as in the case of the valve 11, the valve 11E can reduce vibrations of the membrane 80. Specifically, regardless of when the membrane 80 is fixed to the housing component 40 or the housing component 70, the valve 11E can reduce vibrations of the membrane 80.

Seventh Embodiment

A valve and a fluid control device according to a seventh embodiment of the present disclosure are described with reference to the drawings.

Figure 13:
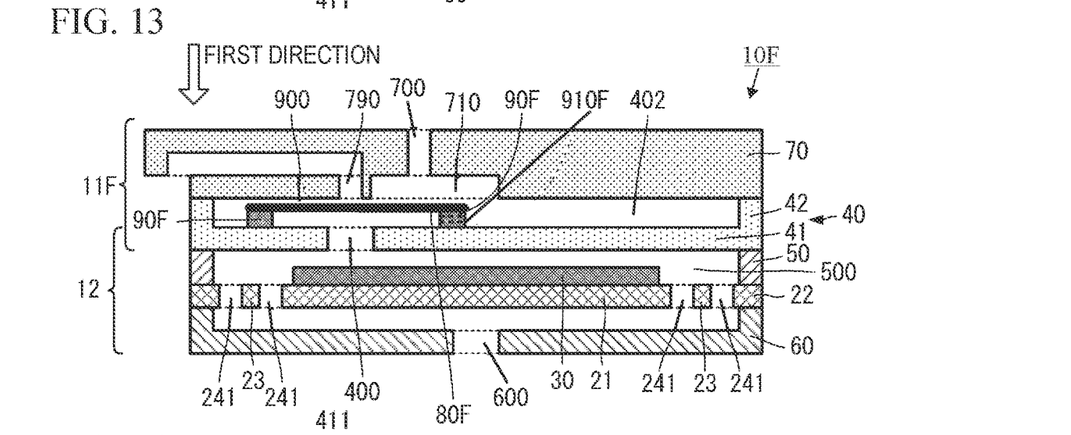
FIG. 13 is a schematic side cross-sectional view of a structure of a fluid control device according to a seventh embodiment.

FIG. 13 is a schematic side cross-sectional view of a structure of a fluid control device according to a seventh embodiment.

As illustrated in FIG. 13, a fluid control device 10F according to a seventh embodiment differs from the fluid control device 10A according to the second embodiment in terms of the structure of a valve 11F. Other components of the fluid control device 10F are the same as those in the fluid control device 10A, and thus are not described. A membrane 80F has the same structure as the membrane 80A, and thus is not specifically described.

The fluid control device 10F includes the valve 11F. The valve 11F includes a holding plate 90F. The holding plate 90F has, for example, an annular shape. The holding plate 90F holds the outer edge portion of the membrane 80F. The holding plate 90F is fixed to the flat plate 41 of the housing component 40.

When the valve 11F is viewed in a plan, the holding plate 90F is fixed while allowing the membrane 80F to overlap the hole 400 and the hole 790.

The holding plate 90F has a hole 910F. The hole 910F extends through an inner surface and an outer surface of the holding plate 90F.

As in the case of the valve 11A, the valve 11F with this structure can reduce vibrations of the membrane 80F. More specifically, regardless of when the membrane 80F is fixed to the housing component 40 or the housing component 70, the valve 11F can reduce the vibrations of the membrane 80F.

Eighth Embodiment

A valve and a fluid control device according to an eighth embodiment of the present disclosure are described with reference to the drawings.

Figure 14:
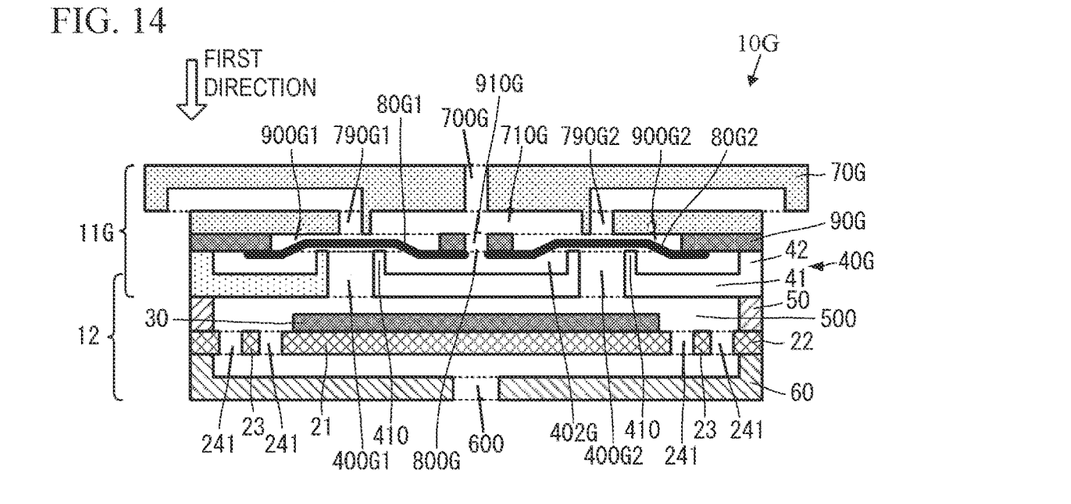
FIG. 14 is a schematic side cross-sectional view of a structure of a fluid control device according to an eighth embodiment.

FIG. 14 is a schematic side cross-sectional view of a structure of the fluid control device according to the eighth embodiment.

As illustrated in FIG. 14, a fluid control device 10G according to the eighth embodiment differs from the fluid control device 10A according to the second embodiment in terms of the structure of a valve 11G. Other components of the fluid control device 10G are the same as those of the fluid control device 10A, and thus are not described.

The fluid control device 10G includes a valve 11G. Schematically, the valve 11G includes multiple functional portions of the valve 11 arranged in parallel to each other.

The valve 11G includes a housing component 40G, a housing component 70G, a membrane 80G1, a membrane 80G2, and a holding plate 90G.

The housing component 40G includes a flat plate 41 having a hole 400G1 and a hole 400G2. The hole 400G1 and the hole 400G2 are spaced apart from each other.

The housing component 70G includes a hole 700G, a hole 710G, a hole 790G1, and a hole 790G2. The hole 700G and the hole 710G are formed in a center region when the housing component 70G is viewed in a plan. The hole 790G1 and the hole 790G2 are formed at positions to hold the hole 700G and the hole 710G in between. When the valve 11G is viewed in a plan, the hole 790G1 overlaps the hole 400G1, and the hole 790G2 overlaps the hole 400G2.

The holding plate 90G includes an opening portion 900G1, an opening portion 900G2, and a hole 910G. The hole 910G is formed at the center when the holding plate 90G is viewed in a plan. When the valve 11G is viewed in a plan, the hole 910G overlaps the hole 710G in the housing component 70G. The opening portion 900G1 and the opening portion 900G2 are formed at positions to hold the hole 910G in between. When the valve 11G is viewed in a plan, the opening portion 900G1 overlaps the hole 400G1 and the hole 790G1, and partially overlaps the hole 710G. When the valve 11G is viewed in a plan, the opening portion 900G2 overlaps the hole 400G2 and the hole 790G2, and partially overlaps the hole 710G.

The membrane 80G1 is held by the holding plate 90G to cover the opening portion 900G1. Thus, when the valve 11G is viewed in a plan, the membrane 80G1 overlaps the hole 400G1 and the hole 790G1.

The membrane 80G2 is held by the holding plate 90G to cover the opening portion 900G2. Thus, when the valve 11G is viewed in a plan, the membrane 80G2 overlaps the hole 400G2 and the hole 790G2.

A hole 800G is formed between the membrane 80G1 and the membrane 80G2. When the valve 11G is viewed in a plan, the hole 800G overlaps the hole 910G. Thus, the hole 910G and the hole 800G are connected to each other.

As in the case of the valve 11, the valve 11G with this structure can reduce vibrations of the membrane 80G1 and the membrane 80G2. The valve 11G includes a first valve function portion including the hole 400G1, the hole 790G1, and the membrane 80G1, and a second valve function portion including the hole 400G2, the hole 790G2, and the membrane 80G2, between the pump 12 and the hole 700G and arranged in parallel to each other. Thus, regardless of when either the first valve function portion or the second valve function portion is broken or damaged, the valve 11G can retain the function of controlling the flow direction.

Ninth Embodiment

A valve and a fluid control device according to a ninth embodiment of the present disclosure are described with reference to the drawings.

Figure 15:
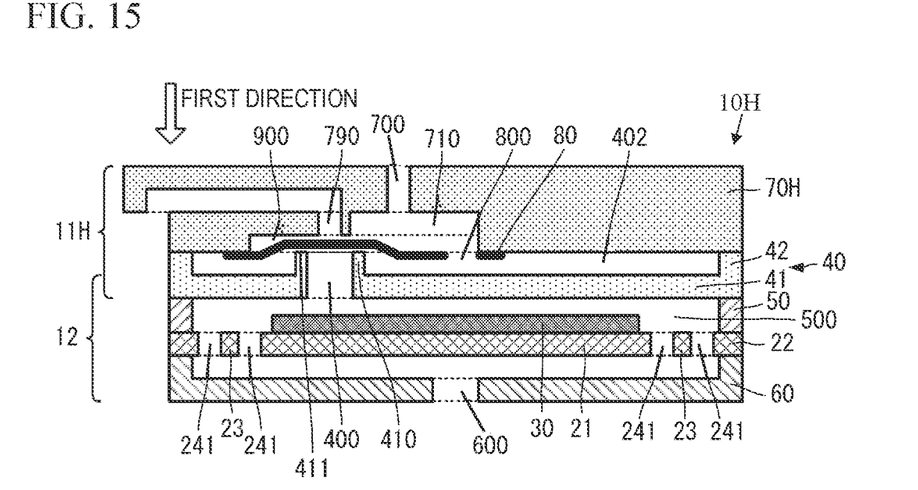
FIG. 15 is a schematic side cross-sectional view of a structure of a fluid control device according to a ninth embodiment.

FIG. 15 is a schematic side cross-sectional view of a structure of a fluid control device according to a ninth embodiment.

As illustrated in FIG. 15, a fluid control device 10H according to a ninth embodiment differs from the fluid control device 10 according to the first embodiment in that it includes a valve 11H. The valve 11H differs from the valve 11 according to the first embodiment in that it eliminates the holding plate 90.

The valve 11H includes a housing component 70H. The outer edge portion of the membrane 80 is fixed to and held by the surface of the housing component 70H facing the valve chamber.

The valve 11H of the fluid control device 10H with this structure can achieve the same effects as the valve 11 of the fluid control device 10.

(Derived Example of Positional Relationship Between Hole 400, Hole 790, and Membrane 80)

Figure 16A:
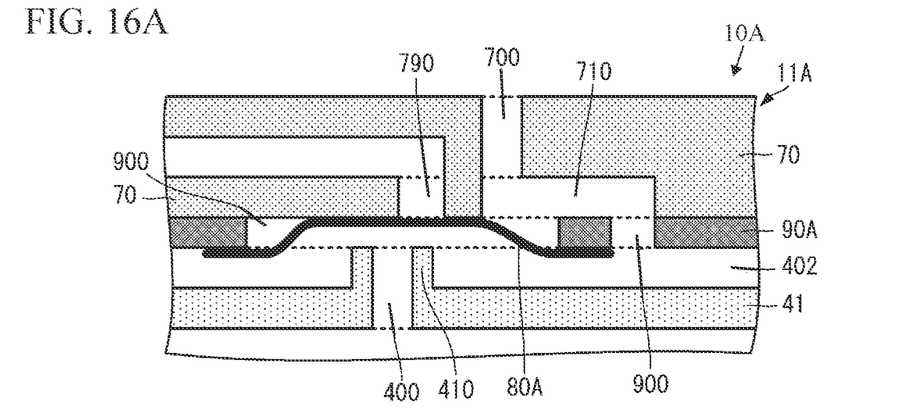
FIG. 16A and FIG. 16B are diagrams of derived examples of the positional relationship between a hole connected to a pump, a gas outflow hole, and a membrane.
Figure 16B:
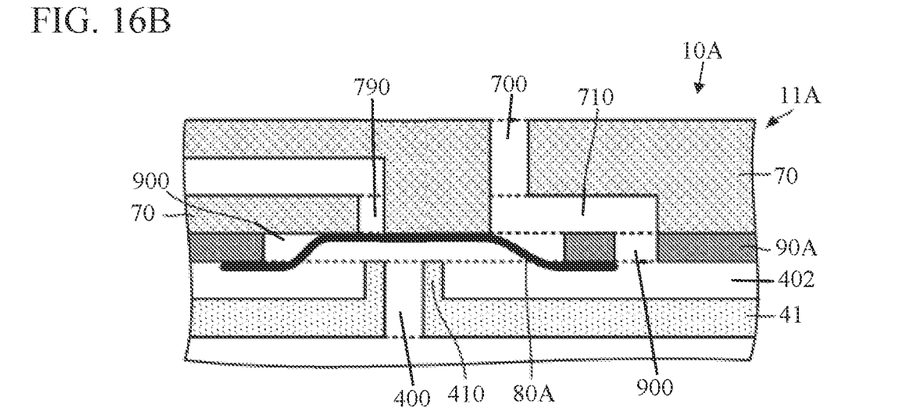

FIG. 16A and FIG. 16B illustrate derived examples of the positional relationship between a hole connected to the pump, a gas discharge hole, and a membrane. FIG. 16A and FIG. 16B are partially enlarged side cross-sectional views of the valve according to the second embodiment used as an example.

In FIG. 16A, when the valve 11A is viewed in a plan, the hole 790 is located closer to the hole 700 than the hole 400, and the opening surface of the hole 790 facing the valve chamber and the opening surface of the hole 400 facing the valve chamber partially overlap each other.

In FIG. 16B, when the valve 11A is viewed in a plan, the hole 400 is located closer to the hole 700 than the hole 790, and the opening surface of the hole 790 facing the valve chamber and the opening surface of the hole 400 facing the valve chamber do not overlap each other.

As illustrated in FIG. 16A and FIG. 16B, when the valve 11A is viewed in a plan, the hole 400 and the hole 790 overlap a deformable area of the membrane 80A.

This structure can reduce vibrations of the membrane 80A. Nevertheless, when the valve 11A is viewed in a plan, the hole 400 and the hole 790 preferably at least partially overlap each other, and more preferably, completely overlap each other, as in the case of the second embodiment.

The membrane 80A may have any shape such as a circular shape or a polygonal shape, but preferably overlaps the hole 400 and the hole 790 at the center of its deformable region.

(Example of Device to which Fluid Control Device is Applied)

A fluid control device with the above structure is to be applied to, for example, a pressurizing device. The pressurizing device includes the fluid control device with any of the above structures, and the cuff 2 connected to the hole 700 (refer to FIG. 2). When the fluid control device causes the gas to flow into the cuff 2, the gas can apply pressure to, for example, a human body in contact with the cuff 2.

Such a pressurizing device is usable as a sphygmomanometer. A sphygmomanometer includes the above pressurizing device, and a measuring portion that measures the blood pressure based on the pressure of the cuff.

With the above description, structures of transportation of the gas are described. However, the above structures are applicable to a structure where a fluid other than the gas is used.

The above embodiments may be appropriately combined one with another, and each combination can exert the corresponding effects.

10, 10A, 10B, 10C, 10D, 10E, 10F, 10G, 10H fluid control device
11, 11A, 11B, 11C, 11D, 11E, 11F, 11G, 11H valve
12 pump
21 main flat plate
22 frame
23 coupler
30 piezoelectric element
40, 40G housing component
41 flat plate
42 side wall
50 side wall member
60 lid member
70, 70G, 70H housing component
80, 80A, 80B, 80C, 80D, 80F, 80G1, 80G2 membrane
90, 90A, 90B, 90C, 90D, 90E, 90F, 90G holding plate
400, 400G1, 400G2 hole
420, 420C support member
700, 700G hole
710, 710G hole
790, 790G1, 790G2 hole
800, 800G hole
900, 900G1, 900G2 opening surface
910, 910G hole
2 cuff

The invention claimed is:

1. A valve comprising:
a housing comprising:
   a first wall having a first hole connectable to an external pump,
   a second wall having a second hole connectable to a component to which a fluid is discharged, and
   a valve chamber held between the first wall and the second wall that oppose each other;
at least one membrane dividing the valve chamber into a space facing the first wall and a space facing the second wall; and
a communicating passage connecting the space facing the first wall and the space facing the second wall to each other,
wherein the second wall has a third hole being connectable to an outside of the housing and allowing the fluid to flow out from the valve chamber,
wherein, when viewed in a first direction of the housing in which the first wall, the membrane, and the second wall are arranged:
   the membrane, an opening surface of the first hole facing the valve chamber, and an opening surface of the third hole facing the valve chamber overlap one another,
   the communicating passage overlaps neither the opening surface of the first hole facing the valve chamber nor the opening surface of the third hole facing the valve chamber, and
   the opening surface of the first hole facing the valve chamber and the opening surface of the third hole facing the valve chamber at least partially overlap each other,
wherein the first wall comprises a protrusion protruding toward the second wall, and
wherein the first hole is provided in the protrusion.

2. The valve according to claim 1,
wherein the communicating passage is provided in the membrane.

3. The valve according to claim 1, comprising:
a plurality of first holes, a plurality of second holes, and a plurality of membranes.

4. The valve according to claim 1, further comprising:
a holding plate extending inward from an outer end of the valve chamber, when viewed in the first direction, and holding the membrane,
wherein the communicating passage is provided in the holding plate.

5. The valve according to claim 1,
wherein, when viewed in the first direction, the opening surface of the first hole facing the valve chamber and the opening surface of the third hole facing the valve chamber are located while having a smaller one of the first and third holes located within a range of the opening surface of a greater one of the first and third holes.

6. The valve according to claim 5,
wherein the second hole comprises a first portion connectable to an outside of the housing and a second portion connectable to the space facing the second wall, and
wherein, when viewed in the first direction, the second portion is greater than the first portion, and the first portion overlaps the second portion.

7. The valve according to claim 5, further comprising:
a holding plate extending inward from an outer end of the valve chamber, when viewed in the first direction, and holding the membrane,
wherein the communicating passage is provided in the holding plate.

8. The valve according to claim 5,
wherein the communicating passage is provided in the membrane.

9. The valve according to claim 1, further comprising:
a support member provided in the first hole.

10. The valve according to claim 9,
wherein an end surface of the support member is flush with the opening surface of the first hole facing the valve chamber.

11. The valve according to claim 9,
wherein an end surface of the support member is located further inward in the first hole than the opening surface of the first hole facing the valve chamber.

12. A fluid control device, comprising:
the valve according to claim 1; and
the pump sharing the first wall, and comprising a pump chamber connected to the first hole.

13. A pressurizing device, comprising:
the fluid control device according to claim 12; and
a cuff connected to the second hole.

14. A sphygmomanometer comprising:
the pressurizing device according to claim 13; and
a measuring portion configured to measure a blood pressure based on a pressure in the cuff.

15. A valve comprising:
a housing comprising:
   a first wall having a first hole connectable to an external pump,
   a second wall having a second hole connectable to a component to which a fluid is discharged, and a valve chamber held between the first wall and the second wall that oppose each other;

at least one membrane dividing the valve chamber into a space facing the first wall and a space facing the second wall; and a communicating passage connecting the space facing the first wall and the space facing the second wall to each other, wherein the second wall has a third hole being connectable to an outside of the housing and allowing the fluid to flow out from the valve chamber, wherein, when viewed in a first direction of the housing in which the first wall, the membrane, and the second wall are arranged:

the membrane, an opening surface of the first hole facing the valve chamber, and an opening surface of the third hole facing the valve chamber overlap one another, the communicating passage overlaps neither the opening surface of the first hole facing the valve chamber nor the opening surface of the third hole facing the valve chamber, and the opening surface of the first hole facing the valve chamber and the opening surface of the third hole facing the valve chamber at least partially overlap each other, wherein the second hole comprises a first portion connectable to an outside of the housing and a second portion connectable to the space facing the second wall, and wherein, when viewed in the first direction, the second portion is greater than the first portion, and the first portion overlaps the second portion.

16. The valve according to claim 15, wherein the first wall comprises a protrusion protruding toward the second wall, and wherein the first hole is provided in the protrusion.

17. The valve according to claim 15, further comprising:

a holding plate extending inward from an outer end of the valve chamber, when viewed in the first direction, and holding the membrane, wherein the communicating passage is provided in the holding plate.

18. A valve comprising:

a housing comprising:

a first wall having a first hole connectable to an external pump, a second wall having a second hole connectable to a component to which a fluid is discharged, and a valve chamber held between the first wall and the second wall that oppose each other;

at least one membrane dividing the valve chamber into a space facing the first wall and a space facing the second wall;

a communicating passage connecting the space facing the first wall and the space facing the second wall to each other; and a holding plate holding the membrane that extends inward from an outer end of the valve chamber, when viewed in a first direction, of the housing in which the first wall, the membrane, and the second wall are arranged, wherein the second wall has a third hole being connectable to an outside of the housing and allowing the fluid to flow out from the valve chamber, wherein, when viewed in the first direction:

the membrane, an opening surface of the first hole facing the valve chamber, and an opening surface of the third hole facing the valve chamber overlap one another, the communicating passage overlaps neither the opening surface of the first hole facing the valve chamber nor the opening surface of the third hole facing the valve chamber, the opening surface of the first hole facing the valve chamber and the opening surface of the third hole facing the valve chamber at least partially overlap each other, and wherein the communicating passage is provided in the holding plate.

* * * * *